(12) United States Patent
Zhang et al.

(10) Patent No.: US 12,388,309 B2
(45) Date of Patent: Aug. 12, 2025

(54) FABRICATION METHOD FOR ROTOR ASSEMBLY

(71) Applicant: HANGZHOU SANHUA RESEARCH INSTITUTE CO., LTD., Zhejiang (CN)

(72) Inventors: Jun Zhang, Zhejiang (CN); Jundi Hu, Zhejiang (CN); Bingjiu Yin, Zhejiang (CN)

(73) Assignee: HANGZHOU SANHUA RESEARCH INSTITUTE CO., LTD., Zhejiang (CN)

( * ) Notice: Subject to any disclaimer, the term of this patent is extended or adjusted under 35 U.S.C. 154(b) by 340 days.

(21) Appl. No.: 17/922,232

(22) PCT Filed: Apr. 21, 2021

(86) PCT No.: PCT/CN2021/088602
§ 371 (c)(1),
(2) Date: Oct. 28, 2022

(87) PCT Pub. No.: WO2021/218728
PCT Pub. Date: Nov. 4, 2021

(65) Prior Publication Data
US 2023/0111184 A1   Apr. 13, 2023

(30) Foreign Application Priority Data

Apr. 30, 2020 (CN) .......................... 202010360293.X
Apr. 30, 2020 (CN) .......................... 202020699969.3
(Continued)

(51) Int. Cl.
*H02K 15/12* (2025.01)
*F04D 13/06* (2006.01)
(Continued)

(52) U.S. Cl.
CPC ............... *H02K 1/30* (2013.01); *F04D 13/06* (2013.01); *F04D 29/22* (2013.01); *H02K 1/278* (2013.01); *H02K 15/03* (2013.01); *H02K 15/12* (2013.01)

(58) Field of Classification Search
CPC ........ F04D 13/06; F04D 29/22; F04D 29/026; F04D 29/20; F04D 29/2222;
(Continued)

(56) References Cited

U.S. PATENT DOCUMENTS 5,331,730 A * 7/1994 Brinn, Jr. .............. H01F 7/1607
                                                      29/606
7,698,818 B2 * 4/2010 Voegele .................. F04C 13/00
                                                      384/255
(Continued)

FOREIGN PATENT DOCUMENTS

CN   105298859 A   2/2016
CN   106321506 A   1/2017
(Continued)

OTHER PUBLICATIONS

European Search Report dated May 15, 2024 for European Appl. No. 21795371.0.
(Continued)

*Primary Examiner* — Donghai D Nguyen
(74) *Attorney, Agent, or Firm* — Ohlandt, Greeley and Perle, L.L.P.

(57) ABSTRACT

A rotor assembly being an injection molded piece, and comprising a first shaft sleeve and a rotor; a first injection molded body is formed by using the rotor and the first shaft sleeve as injection molding inserts to pass through injection molding; a second injection molded body is formed by at least using the first injection molded body as an injection molding insert to pass through injection molding; the second
(Continued)

injection molded body comprises a lower cover plate and a wrapping layer, the wrapping layer wrapping around at least a portion of the outer peripheral surface of the first injection molded body; the rotor assembly further comprises blades, the blades being fixedly connected to the lower cover plate or the blades forming an integrated structure with the lower cover plate.

15 Claims, 14 Drawing Sheets

(30) Foreign Application Priority Data

May 19, 2020 (CN) .......................... 202010425117.X
May 19, 2020 (CN) .......................... 202020845212.0

(51) Int. Cl.
  *F04D 29/22* (2006.01)
  *H02K 1/278* (2022.01)
  *H02K 1/30* (2006.01)
  *H02K 15/03* (2006.01)

(58) Field of Classification Search
  CPC ...... H01F 7/1607; H02K 1/278; H02K 15/03; H02K 15/12; Y10T 29/49009; Y10T 29/53143
  See application file for complete search history.

(56) References Cited

U.S. PATENT DOCUMENTS

| | | | |
|---|---|---|---|
| 10,584,705 B2 * | 3/2020 | Niu | ........................ F04D 29/026 |
| 2014/0072414 A1 | 3/2014 | Koegel et al. | |
| 2020/0072224 A1 | 3/2020 | Zou et al. | |
| 2021/0131448 A1 * | 5/2021 | Wang | ........................ F04D 13/06 |

FOREIGN PATENT DOCUMENTS

| | | |
|---|---|---|
| CN | 208749654 A | 4/2019 |
| CN | 209329801 U | 8/2019 |
| CN | 110871545 A | 3/2020 |
| CN | 110873062 A | 3/2020 |
| EP | 3418577 A1 | 12/2018 |
| JP | 5143165 B2 | 2/2013 |
| JP | 2017180130 A | 10/2017 |

OTHER PUBLICATIONS

International Search Report dated Jun. 29, 2021 for PCT Appl. No. PCT/CN2021/088602.

* cited by examiner

FABRICATION METHOD FOR ROTOR ASSEMBLY

This application is the national phase of International Patent Application No. PCT/CN2021/088602, titled "FABRICATION METHOD FOR ROTOR ASSEMBLY, ROTOR ASSEMBLY, AND ELECTRIC PUMP", filed on Apr. 21, 2021, which claims priority to Chinese Patent Application No. 202020699969.3, titled "ROTOR ASSEMBLY AND ELECTRIC PUMP", filed on Apr. 30, 2020 with the China National Intellectual Property Administration, Chinese Patent Application No. 202020845212.0, titled "ROTOR ASSEMBLY AND ELECTRIC PUMP", filed on May 19, 2020 with the China National Intellectual Property Administration, Chinese Patent Application No. 202010360293.X, titled "ROTOR ASSEMBLY AND ELECTRIC PUMP", filed on Apr. 30, 2020 with the China National Intellectual Property Administration, and Chinese Patent Application No. 202010425117.X, titled "METHOD FOR FABRICATING ROTOR ASSEMBLY", filed on May 19, 2020 with the China National Intellectual Property Administration, all of which are incorporated herein by reference in their entireties.

FIELD

The present disclosure relates to a rotor assembly, a method for fabricating the rotor assembly, and an electric pump.

BACKGROUND

An electric pump includes a pump shaft and a rotor assembly. The rotor assembly surrounds the pump shaft. The rotor assembly is rotatable around or with the pump shaft. The rotor assembly includes a rotor, a lower cover plate, a blade and other components. A shaft sleeve may be press-fitted in the rotor assembly in order to reduce a friction during rotation of the rotor assembly. The shaft sleeve, when being press-fitted, is subject to a pressing force, placing relatively high requirements on a material of the shaft sleeve and on strength at a joint between another component and the shaft sleeve in the rotor assembly, thereby increasing a manufacturing cost of the rotor assembly. Therefore, how to reduce the fabricating cost of the rotor assembly is a technical problem to be considered.

SUMMARY

A rotor assembly, a method for fabricating the rotor assembly, and an electric pump are provided according to the present disclosure, so as to reduce a manufacturing cost of the rotor assembly.

To achieve the objective, the following technical solutions are proposed in embodiments of the present disclosure.

A method for fabricating a rotor assembly is provided. The rotor assembly is formed by injection molding. The rotor assembly includes a rotor and a first shaft sleeve. The method includes: S1, manufacturing the first shaft sleeve and the rotor; S2, forming a first injection-molded part by injection molding, where the rotor and the first shaft sleeve serve as an insert for the injection molding; and the method for fabricating a rotor assembly further includes one of S3 to S6: S3, forming a second injection-molded part by injection molding, where at least the first injection-molded part serves as an insert for the injection molding, and where the second injection-molded part includes a wrapping layer at least partially wrapping the first injection-molded part; and the second injection-molded part further includes a lower cover plate and a blade that are integrally formed by injection molding; S4, forming a second injection-molded part by injection molding, where at least the first injection-molded part serves as an insert for the injection molding, and where the second injection-molded part includes a wrapping layer at least partially wrapping the first injection-molded part, the second injection-molded part further includes a lower cover plate, the rotor assembly further includes a blade and an upper cover plate that are integrally formed, a lower end of the blade is fixedly connected to the lower cover plate by welding, and the blade and the upper cover plate are formed in S1; S5, forming a second injection-molded part by injection molding, where at least the first injection-molded part serves as an insert for the injection molding, and where the second injection-molded part includes a wrapping layer at least partially wrapping the first injection-molded part, the second injection-molded part further includes a lower cover plate and a blade, the rotor assembly further includes an upper cover plate, an upper end of the blade is fixedly connected to the upper cover plate by welding; and the upper cover plate is formed in S1; and S6, forming a second injection-molded part by injection molding, where at least the first injection-molded part serves as an insert for the injection molding, and where the second injection-molded part includes a wrapping layer at least partially wrapping the first injection-molded part, the second injection-molded part further includes a lower cover plate, the rotor assembly further includes a blade and an upper cover plate, an upper end of the blade is fixedly connected to the upper cover plate by welding, a lower end of the blade is fixedly connected to the lower cover by welding, and the blade and the upper cover plate are formed in S1.

A rotor assembly is provided. The rotor assembly includes a first injection-molded part. The first injection-molded part includes a first shaft sleeve and a rotor. The rotor is arranged around the first shaft sleeve. The first injection-molded part is formed by injection molding, where at least the rotor and the first shaft sleeve serve as an insert for the injection molding. The first injection-molded part further includes a connecting portion for connecting the rotor to the first shaft sleeve. A second injection-molded part is formed by injection molding, where at least the first injection-molded part serves as an inset for the injection molding. The second injection-molded part includes a lower cover plate and a wrapping layer, and the wrapping layer at least partially wraps the first injection-molded part. The rotor assembly further includes a blade. The lower cover plate is closer to the rotor than the blade along an axis of the rotor assembly. The blade is fixedly connected to the lower cover plate, or the blade and the lower cover plate are integrally formed.

An electric pump is provided. The electric pump includes a pump shaft and a rotor assembly. The rotor assembly is arranged around the pump shaft. The rotor assembly is as described above.

With the method for fabricating a rotor assembly, the first shaft sleeve is fixed by injection molding, thereby reducing requirements on strength of a material of the first shaft sleeve. Therefore, the manufacturing cost of the first shaft sleeve is reduced, and thus the manufacturing cost of the rotor assembly is reduced.

In the rotor assembly and the electric pump provided in the present disclosure, the rotor assembly is formed by injection molding. The rotor assembly includes the first shaft sleeve and a rotor. The first injection-molded part is formed by injection molding, with the rotor and the first shaft sleeve as an insert for the injection molding. The second injection-molded part is formed by injection molding, with at least the first injection-molded part as an insert for the injection molding. The second injection-molded part further includes a lower cover plate and a wrapping layer. The wrapping layer at least wraps partially the first injection-molded part. The rotor assembly further includes a blade. The blade is fixedly connected to the lower cover plate or the blade and the lower cover plate are integrally formed. With the above structure, the first shaft sleeve is fixed by injection molding, thereby reducing requirements on the strength of material of the first shaft sleeve 13 and a joint for the first shaft sleeve in the rotor assembly. Therefore, material costs for the first shaft sleeve and the joint for the first shaft sleeve in the rotor assembly are reduced, thereby reducing the manufacturing cost of the rotor assembly.

DETAILED DESCRIPTION OF EMBODIMENTS

The present disclosure is further described below in conjunction with the accompanying drawings and specific embodiments.

The specific embodiments of the present disclosure are described in detail below with reference to the accompanying drawings. First of all, it should be noted that the location terms, such as upper, lower, left, right, front, rear, inside, outside, top and bottom, mentioned or possibly mentioned in this specification are relative concepts defined based on those constructs shown in the corresponding drawings, and therefore may vary with locations or states of use. Hence, these and other terms of location should not be construed as limiting.

An electric pump according to the following embodiments is configured to provide flow power for a working medium of a thermal management system of an automobile. The working medium may be a 50% ethylene glycol aqueous solution, or clean water. Alternatively, the working medium may contain other substances.

Figure 1:
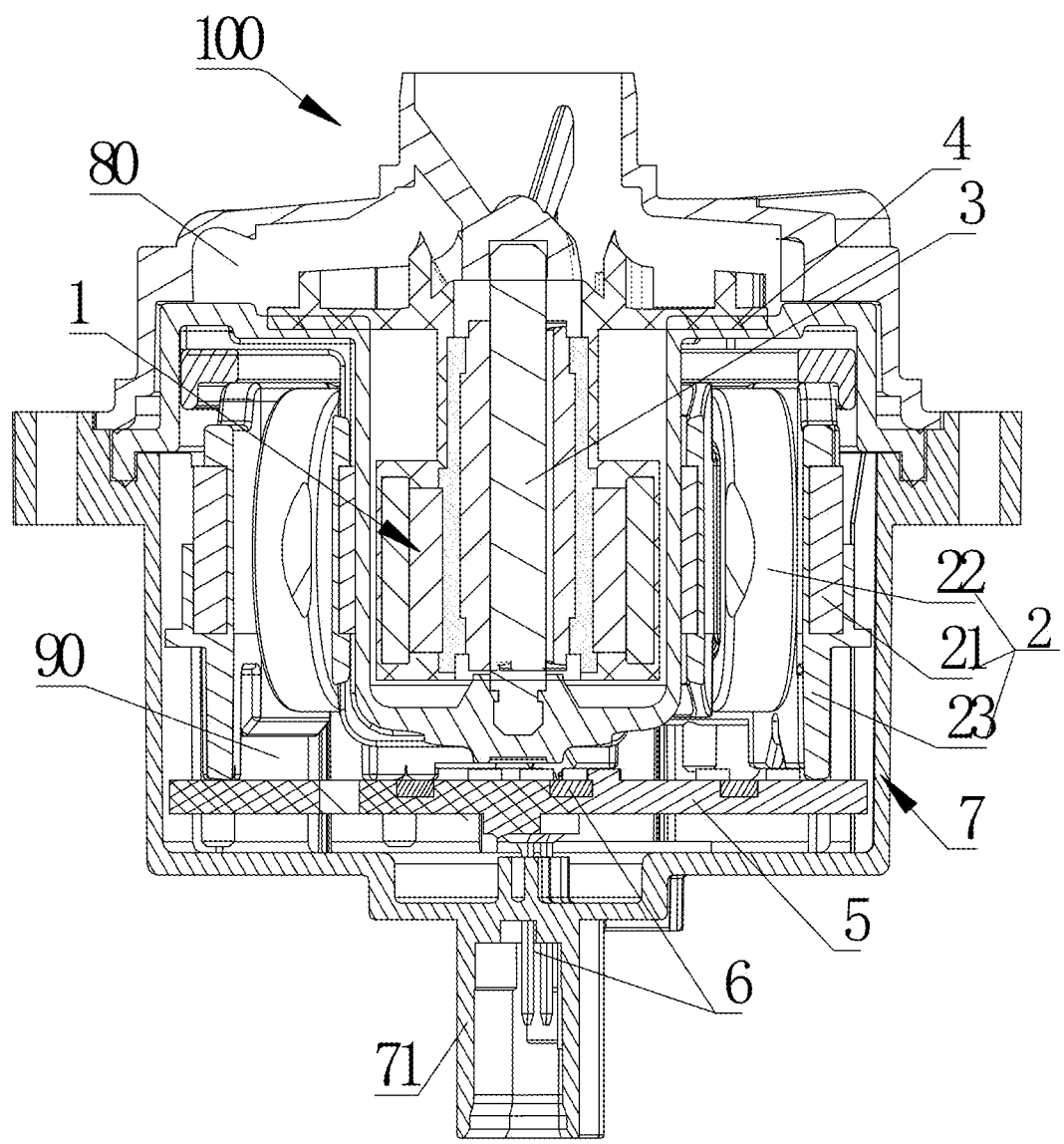
FIG. 1 is a schematic structural diagram showing a cross-section view of an electric pump according to an embodiment of the present disclosure.

Referring to FIG. 1, the electric pump 100 includes a pump housing, a rotor assembly 1, a stator assembly 2, a pump shaft 3, and an isolation portion 4. The rotor assembly 1 is sleeved on an outer periphery of the pump shaft 3. The electric pump 100 defines a pump cavity inside. The pump cavity is separated by the isolation portion 4 into a first cavity 80 and a second cavity 90. The first cavity 80 allows the working medium to flow through, and the second cavity 90 is not in direct contact with the working medium. The rotor assembly 1 is located in the first cavity 80, and the stator assembly 2 is located in the second cavity 90. Referring to FIG. 1, the stator assembly 2 includes a stator core 21, an insulating frame 23, and a winding 22. The insulating frame 23 at least partially covers the stator core 21, and the winding 22 is wound around the insulating frame 23, so that the winding 22 is electrically insulated from the stator core 21 because of the insulating frame 23 arranged between the winding 22 and the stator core 21. The electric pump 100 controls, when being in operation, an excitation magnetic field generated by the stator assembly 2 by controlling a current passing through the winding 22 of the stator assembly 2, and the rotor assembly 1 rotates around or with the pump shaft 3 under the excitation magnetic field.

Figure 2:
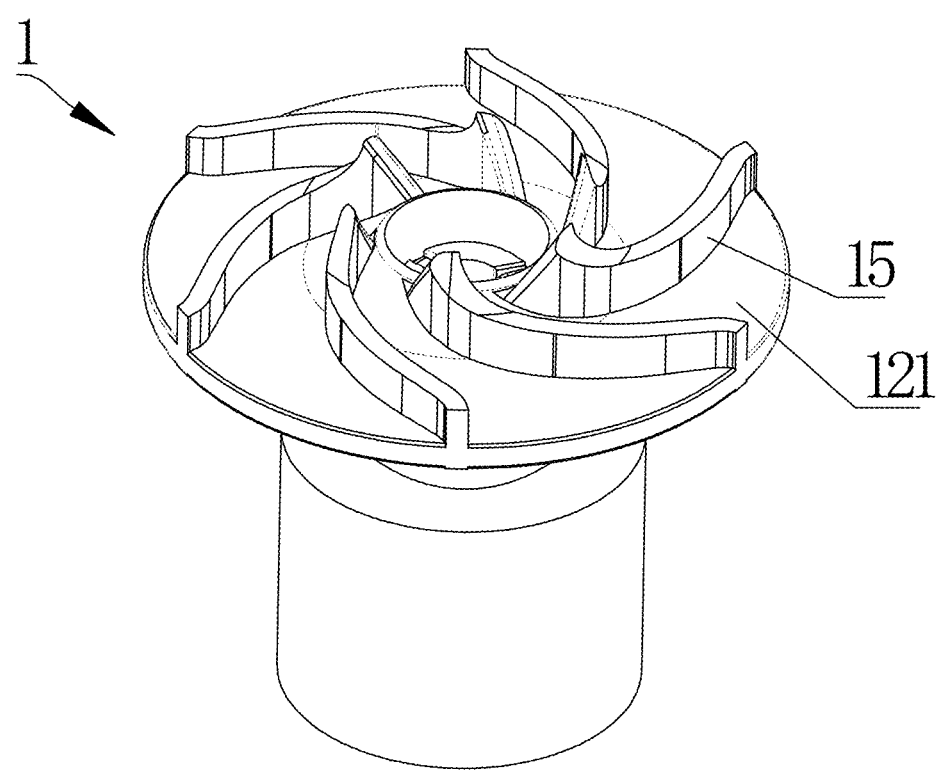
FIG. 2 is a schematic structural diagram showing a three-dimensional view of a rotor assembly in FIG. 1 according to a first embodiment.

Reference is made to FIG. 2, which is a schematic structural diagram showing a rotor assembly according to a first embodiment. The rotor assembly in the first embodiment is described in detail below.

Figure 3:
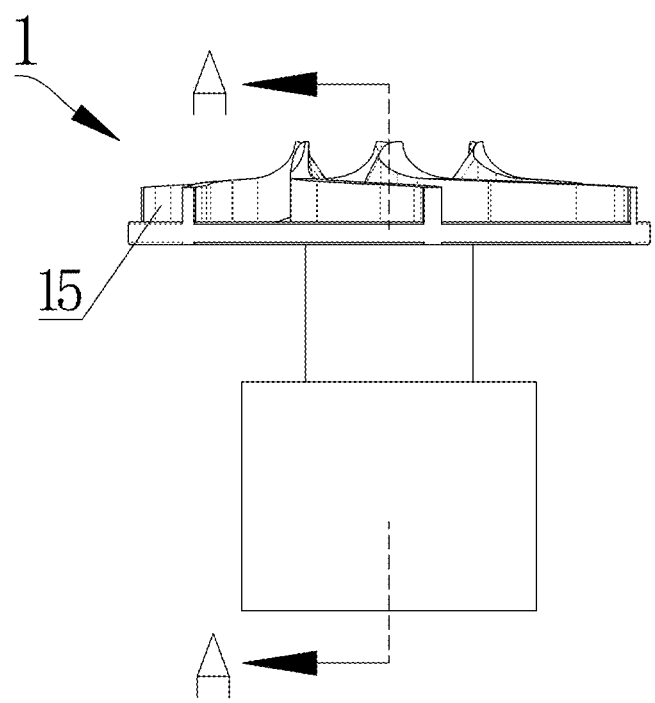
FIG. 3 is a schematic structural diagram showing a front view of the rotor assembly in FIG. 2.
Figure 4:
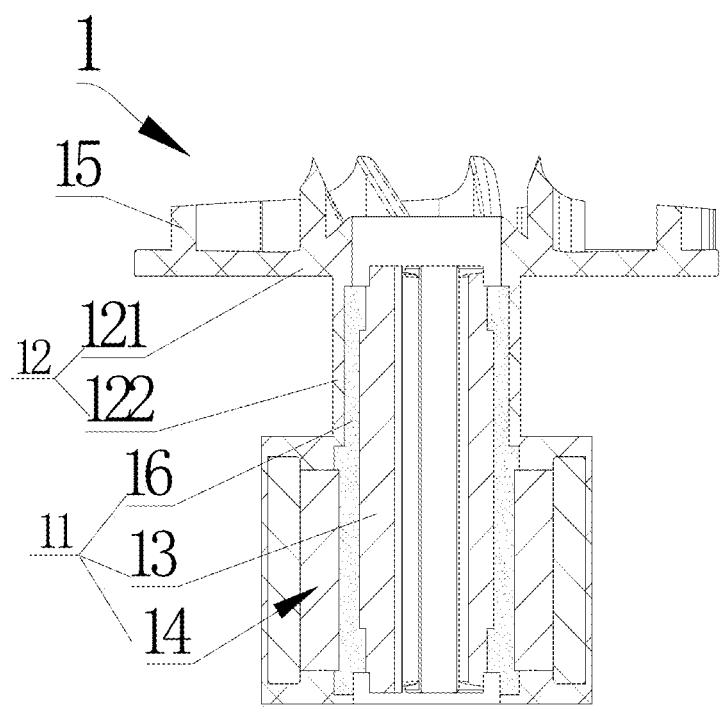
FIG. 4 is a schematic structural diagram showing a cross-section view of the rotor assembly along a cutting plane line A-A in FIG. 3.

As shown in FIG. 2 to FIG. 5, the rotor assembly 1 includes a first injection-molded part 11. The first injection-molded part 11 includes a first shaft sleeve 13, a rotor 14, and a connecting part 16. The rotor 14 includes a permanent magnet material. The rotor 14 surrounds the first shaft sleeve 13. The connecting part 16 connects the rotor 14 and the first shaft sleeve 13. The connecting part 16 is made of plastic. In this embodiment, the first injection-molded part 11 is formed by injection molding with the rotor 14 and the first shaft sleeve 13 each as an insert for the injection molding. The connecting part 16 is formed by injecting plastic. The first injection-molded part 11 is integrally formed. A second injection-molded part 12 is formed by injection molding with the first injection part 11 as an insert. As shown in FIG. 3 and FIG. 4, the second injection-molded part 12 includes a lower cover plate 121 and a wrapping layer 122. The wrapping layer 122 partially wraps around the first injection-molded part 11. In this embodiment, the rotor assembly 1 further includes a blade 15. Along an axis of the rotor assembly 1, the lower cover plate 121 is closer to the rotor 14 than the blade 15. In this embodiment, the blade 15 and the lower cover plate 121 are integrally formed by injection molding. Alternatively, the blade 15 is formed separately from the lower cover plate 121 as described in a fourth embodiment and a fifth embodiment of the rotor assembly, which is not described in detail here. With the above structure, the first shaft sleeve 13 is fixed by injection molding, thereby reducing requirements on the strength of material of the first shaft sleeve 13 and a joint for the first shaft sleeve 13 in the rotor assembly 1. Therefore, material costs for the first shaft sleeve 13 and the joint for the first shaft sleeve 13 in the rotor assembly are reduced, thereby reducing the manufacturing cost of the rotor assembly.

Figure 5:
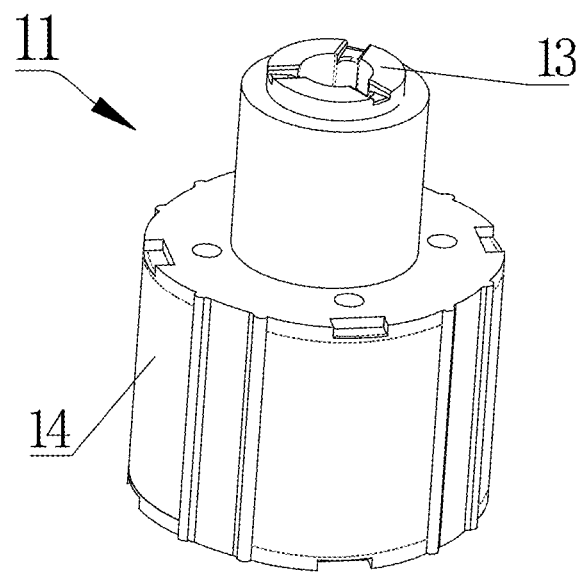
FIG. 5 is a schematic structural diagram showing a three-dimensional view of a first injection-molded part in FIG. 4 when viewed from a direction.

Reference is made to FIG. 4 and FIG. 5. In this embodiment, a connecting portion between the rotor 14 and the first shaft sleeve 13 forms a plastic part of the first injection-molded part 11. The lower cover plate 121 and the wrapping layer 122 of the second injection-molded part 12, and the blade 15 form a plastic part of the second injection-molded part 12. The plastic part of the first injection-molded part 11 may be made of the same material as the plastic part of the second injection-molded part 12 or may be made of material different from the plastic part of the second injection-molded part 12. In a case that the first injection-molded part 11 is made of material different from the plastic part of the second injection-molded part 12, the plastic part of the second injection-molded part 12 is designed as more corrosion resistant than the plastic part of the first injection-molded part 11. This is because that the plastic part of the second injection-molded part 12 is to be in contact with the working medium. In addition, the plastic part of the second injection-molded part 12 is subjected to a force from the working medium when being in contact with the working medium, resulting in a risk of fracture. Therefore, in a case that the first injection-molded part 11 is made of material different from the plastic part of the second injection-molded part 12, the plastic part of the second injection-molded part 12 is designed as tougher than the plastic part of the first injection-molded part 11.

The first shaft sleeve of the rotor assembly according to the first embodiment is described in detail below.

Reference is made to FIG. 6a to FIG. 8, each of which is a schematic structural diagram showing the first shaft sleeve according to the first embodiment. Structure of the first shaft sleeve in the first embodiment is described in detail below.

Reference is made to FIG. 4. In this embodiment, along the axis of the rotor assembly 1, the first shaft sleeve 13 is longer than the rotor 14. An upper end of the first shaft sleeve 13 is higher than an upper end of the rotor 14, and a lower end of the first shaft sleeve 13 is lower than a lower end of the rotor 14. Reference is made to FIG. 1. In this embodiment, along the axis of the rotor assembly 1, a length of the first shaft sleeve 13 is greater than or equal to a half of a length of the pump shaft 3, so that a radial support area of the pump shaft 3 on the first shaft sleeve 13 is relatively increased, thereby reducing a frictional force between the pump shaft 3 and the first shaft sleeve 13.

Figure 6A:
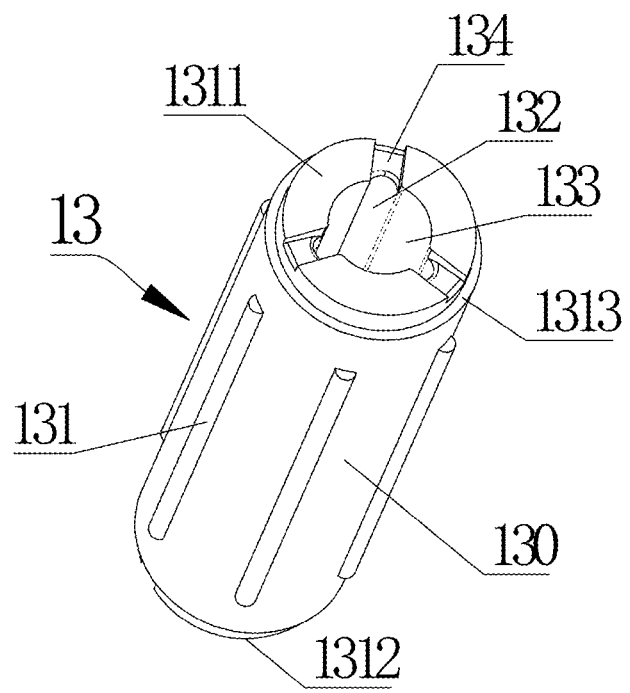
FIG. 6a is a schematic structural diagram showing a three-dimensional view of a first shaft sleeve in FIG. 4 according to a first embodiment when viewed from a direction.
Figure 6B:
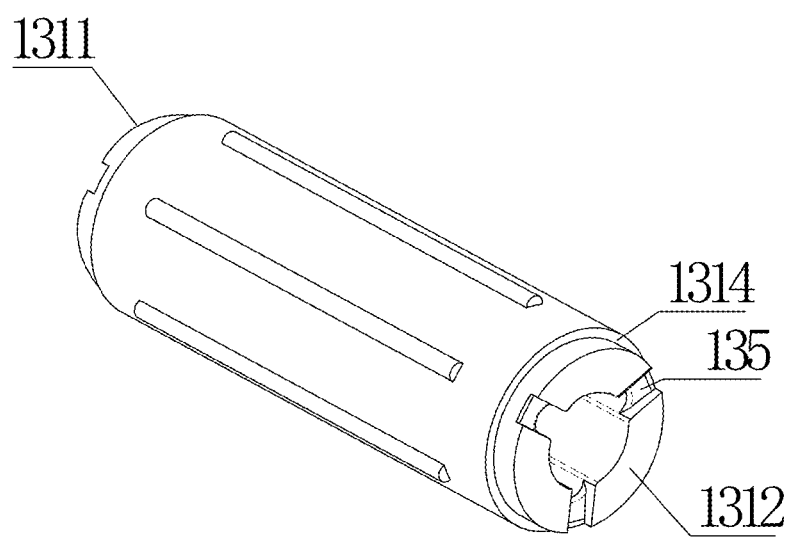
FIG. 6b is a schematic structural diagram showing a three-dimensional view of the first shaft sleeve in FIG. 4 according to the first embodiment when viewed from another direction.
Figure 7:
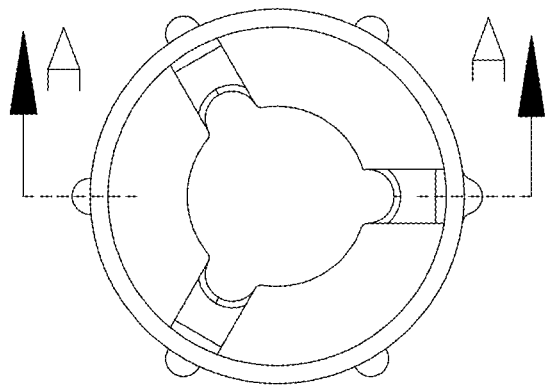
FIG. 7 is a schematic structural diagram showing a front view of the first shaft sleeve in FIG. 6a or FIG. 6b.
Figure 8:
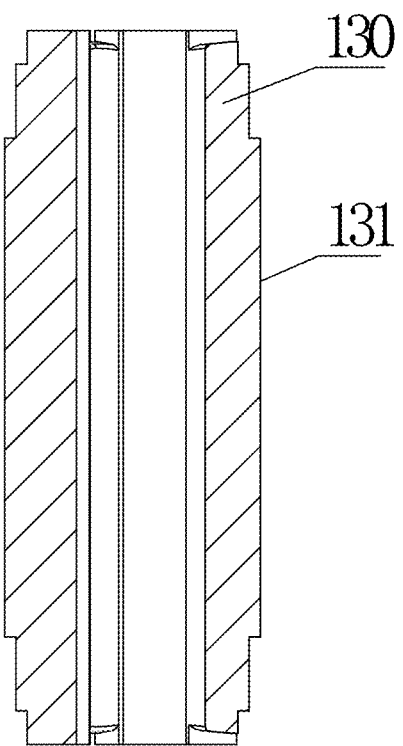
FIG. 8 is a schematic structural diagram showing a cross-section view of the first shaft sleeve along a cutting plane line A-A in FIG. 7.

Reference is made to FIG. 6a to FIG. 8. In this embodiment, the first shaft sleeve 13 includes a body portion 130 and at least one limiting portion 131. The limiting portion 131 is protruded from an outer peripheral surface of the body portion 130, and extends along an axis of the first shaft sleeve 13. Along the axis of the first shaft sleeve 13, the limiting portion 131 is shorter than the body portion 130. An upper end of the limiting portion 131 is located below an upper end of the body portion 130, and a lower end of the limiting portion 131 is located above a lower end of the body portion 130. Therefore, during the injection molding of the first injection-molded part 11, the connecting portion may be formed on both the upper end and the lower end of the limiting portion 131, so as to prevent an axial movement of the first shaft sleeve 13 during use of the rotor assembly. In addition, during the injection molding of the first injection-molded part 11, the connecting portion may be formed on an outer peripheral surface and a side surface of the limiting portion 131, so as to prevent a circumferential movement of the first shaft sleeve 13 during the use of the rotor assembly. Referring to FIG. 7, in this embodiment, the first shaft sleeve 13 includes six limiting portions 131 evenly arranged along the circumference of the first shaft sleeve 13. Alternatively, the limiting portions 131 may be unevenly arranged along the circumference of the first shaft sleeve 13. Moreover, the number of the limiting portions 131 may be two, three, or another number.

Referring to FIG. 6a to FIG. 8, the first shaft sleeve 13 further includes a first concave portion 132 and a first hole portion 133. The first hole portion 133 extends along the axis of the first shaft sleeve 13. The pump shaft 3 in FIG. 1 is inserted inside the first hole portion 133 and is arranged in clearance fit with an inner peripheral surface of the first hole portion 133. The first concave portion 132 is concave from the inner peripheral surface of the first hole portion 133, and extends along an axis of the first hole portion 133. In this embodiment, the first concave portion 132 extends through the first shaft sleeve 13 along the axis of the first hole portion 133. Therefore, referring to FIG. 1, the working medium is allowed to partially flow into and then stored in the first concave portion 132 during an operation of the electric pump, lubricating the pump shaft 3 in FIG. 1, thereby reducing the friction between the pump shaft 3 and the first shaft sleeve 13. In this embodiment, as shown in FIG. 5 and FIG. 6a, the first shaft sleeve 13 includes three first concave portions 132 evenly arranged along a circumference of the first shaft sleeve 13. Alternatively, the number of the first concave portion 132 may also be one or more.

Referring to FIG. 6a to FIG. 8, the first shaft sleeve 13 further includes a second concave portion 134 concave inward from an upper end surface 1311 of the first shaft sleeve 13. The second concave portion 134 is in communication with the first concave portion 132. The second concave portion 134 is arranged close to an end of the first concave portion 132 along the axis of the first shaft sleeve 13, directing the working medium into the first concave portion 132. In this embodiment, the second concave portion 134 and the first concave portion 132 are equal in number. That is, the first shaft sleeve 13 includes three second concave portions 134 in communication with the three first concave portions 132, respectively.

As shown in FIG. 6b, the first shaft sleeve 13 further includes a third concave portion 135 concave inward from a lower end surface 1312 of the first shaft sleeve 13. The third concave portion 135 is in communication with the first concave portion 132. The third concave portion 135 is arranged close to the other end of the first concave portion 132 along the axis of the first shaft sleeve 13, directing the working medium out of the first concave portion 132. In this embodiment, the third concave portion 135 and the first concave portion 132 are equal in number. That is, the first shaft sleeve 13 includes three third concave portions 135 in communication with the three first concave portions 132, respectively.

Referring to FIG. 6a and FIG. 6b, the first shaft sleeve 13 further includes a first stepped surface 1313 and a second stepped surface 1314. The first stepped surface 1313 is located below the upper end surface 1311 of the first shaft sleeve 13, and the second stepped surface 1314 is located above the lower end surface 1312 of the first shaft sleeve 13. An outer contour of the first stepped surface 1313 is farther from a central axis of the first shaft sleeve 13 than an outer contour of the upper end surface 1311 of the first shaft sleeve. An outer contour of the second stepped surface 1314 is farther from the central axis of the first shaft sleeve 13 than an outer contour of the lower end surface 1312 of the first shaft sleeve. The first stepped surface 1313 and the second stepped surface 1314 each serve as a positioning reference plane in an injection mold during the injection molding. Therefore, the upper end surface 1311 and the lower end surface 1312 of the first shaft sleeve 13 are inserted into the injection mold, and isolated from injected plastic during the injection molding, preventing the upper end surface 1311 and the lower end surface 1312 form being covered with plastic. Therefore, no plastic falls off from the upper end surface 1311 and the lower end surface 1312 of the first shaft sleeve 13 during the use of the electric pump, thereby preventing the working medium from being polluted.

Figure 9:
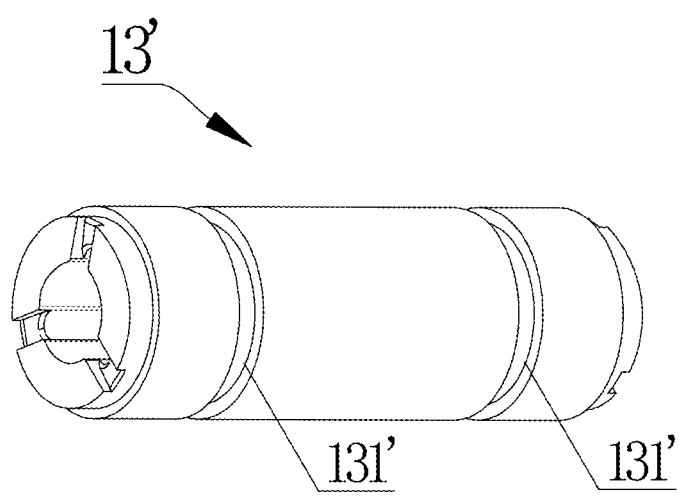
FIG. 9 is a schematic structural diagram showing a three-dimensional view of the first shaft sleeve in FIG. 4 according to a second embodiment.

Reference is made to FIG. 9, which is a schematic structural diagram showing the first shaft sleeve according to a second embodiment. The first shaft sleeve according to the second embodiment is described in detail below.

Reference is made to FIG. 9. In this embodiment, the first shaft sleeve 13' includes at least one limiting portion 131'. The limiting portion 131' is concave inward from the outer peripheral surface of the first shaft sleeve 13', and extends along the circumference of the first shaft sleeve 13'. In this embodiment, the limiting portion 131' completely extends along the circumference of the rotor assembly 13', that is, the limiting portion 131' is an annular groove. Alternatively, the limiting portion 131' may partially extend along the circumference of the first shaft sleeve 13'. Therefore, a concave portion of the limiting portion 131' is filled with injection molding material during the injection molding of the first injection-molded part 11, thereby preventing the first shaft sleeve 13' for moving along its axis during the operation of the rotor assembly. The limiting portion 131', partially extending along the circumference of the first shaft sleeve 13', is further prevented from moving circumferentially. In this embodiment, the first shaft sleeve 13' includes two limiting portions 131' formed at a set distance apart along the axis of the first shaft sleeve 13'. Alternatively, the number of the limiting portion 131' may be one or another number, depending on a length of the first shaft sleeve.

Reference is made to FIG. 6a, FIG. 6b and FIG. 9. According to the above-mentioned embodiments, the first shaft sleeve defines the limiting portion in order to prevent movement of the first shaft sleeve. Alternatively, the outer peripheral surface of the first shaft sleeve may be provided with a knurled structure, a threaded structure, or other rough structures with an uneven surface. Therefore, the uneven surface is filled with plastic in the first injection-molded part, so that a bonding force between the first shaft sleeve and the plastic in the first injection-molded part is enhanced, thereby preventing movement of the first shaft sleeve.

The rotor in the rotor assembly according to the first embodiment is described in detail below.

Figure 10:
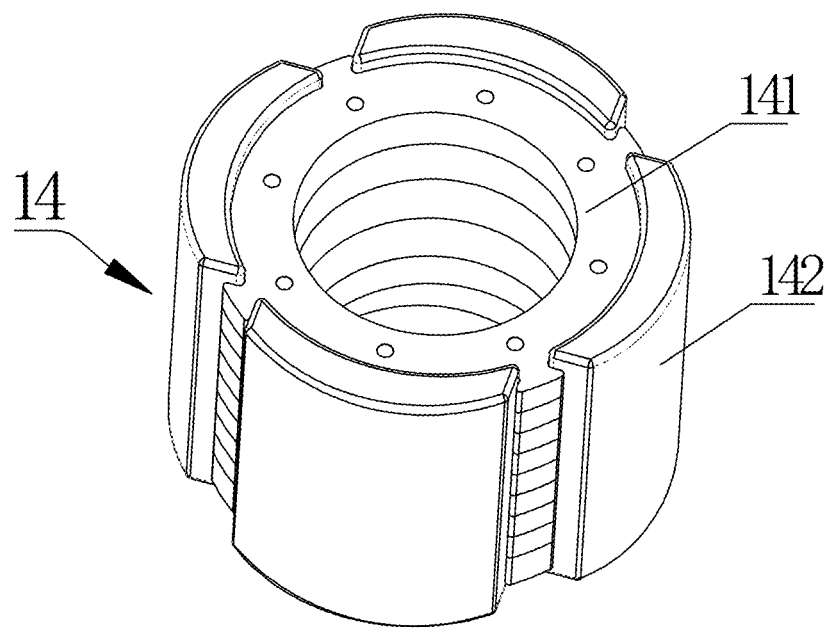
FIG. 10 is a schematic structural diagram showing a three-dimensional view of a rotor in FIG. 4.

Reference is made to FIG. 10, which is a schematic structural diagram showing the rotor in the rotor assembly according to the first embodiment. A structure of the rotor in the rotor assembly according to the first embodiment is described in detail below.

Figure 11:
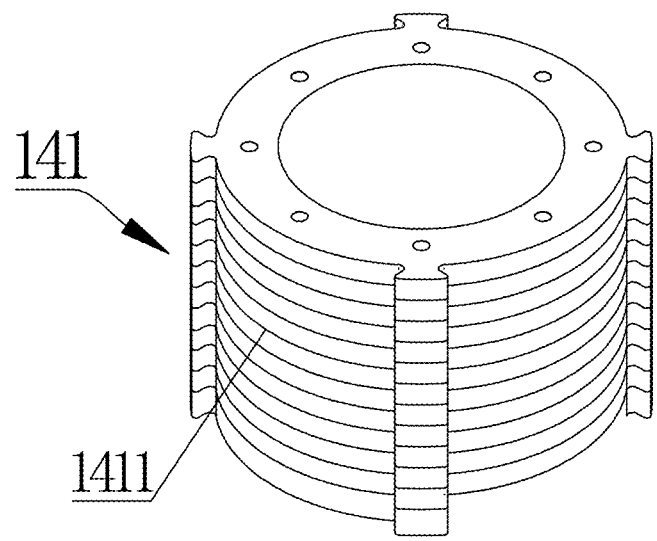
FIG. 11 is a schematic structural diagram showing a three-dimensional view of a rotor core in FIG. 10.

Reference is made to FIG. 10 and FIG. 11. In this embodiment, the rotor 14 includes a rotor core 141 and a permanent magnet 142. Referring to FIG. 4 and FIG. 5, the rotor core 141 is fixed to the first shaft sleeve 13 by injection molding, and the permanent magnet 142 is fixed to the rotor core 131 by injection molding. The wrapping layer 122 of the second injection-molded part 12 covers the permanent magnet 142, isolating the permanent magnet 142 from the outside of the rotor assembly. Therefore, the permanent magnet 142 is shielded from corrosion by the working medium, thereby prolonging a service life of the rotor assembly.

Figure 12:
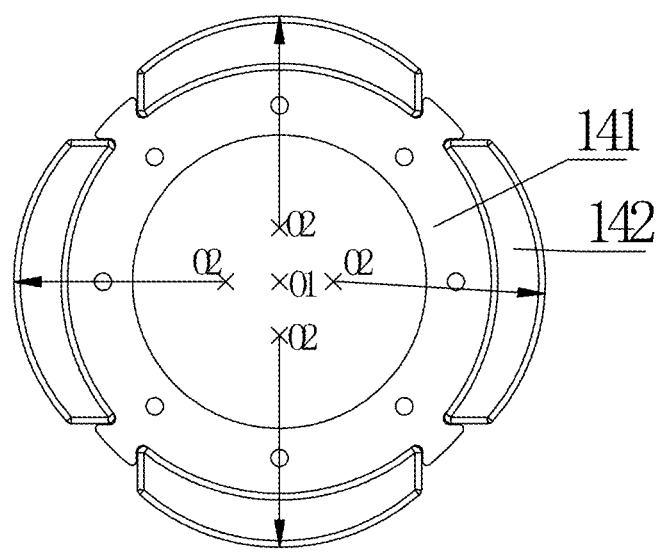
FIG. 12 is a schematic structural diagram showing a front view of the rotor in FIG. 10.

Reference is made to FIG. 10 to FIG. 12. In this embodiment, the rotor core 141 includes silicon steel sheets that are laminated and riveted together. The rotor core 141 includes a mounting portion 1411. The mounting portion 1411 is concave inward from the outer peripheral surface of the rotor core 141. The permanent magnet 142 is partially disposed in the mounting portion 1411, and the inner peripheral surface of the permanent magnet 142 is fitted with a side surface of the mounting portion 1411, so that a position of the permanent magnet 142 is limited along the circumference of the rotor. In this embodiment, the permanent magnet 142 is of a block structure. The rotor 14 includes four permanent magnets 142, and the rotor core 141 includes four mounting portions 1411. The number of the mounting portions 1411 is equal to the number of the permanent magnets 142. As shown in FIG. 10 and FIG. 12, the inner peripheral surface of the permanent magnet 142 is concave and the outer peripheral surface of the permanent magnet 142 is convex. The rotor is cross-sectioned with a plane perpendicular to the axis of the rotor assembly 1. A center O2 of the outer peripheral surface of the permanent magnet 142 does not coincide with a central axis of the rotor core 141 in cross section, and a center O1 of the inner peripheral surface of the permanent magnet 142 coincides with the central axis of the rotor core 141 in cross section. That is, the inner peripheral surface of the permanent magnet 142 centered on O1 is nonconcentric with the outer peripheral surface of the permanent magnet centered on O2, so as to reduce slot ripples, thereby reducing the torque ripple. therefore, the rotor assembly operates smoothly.

Figure 13:
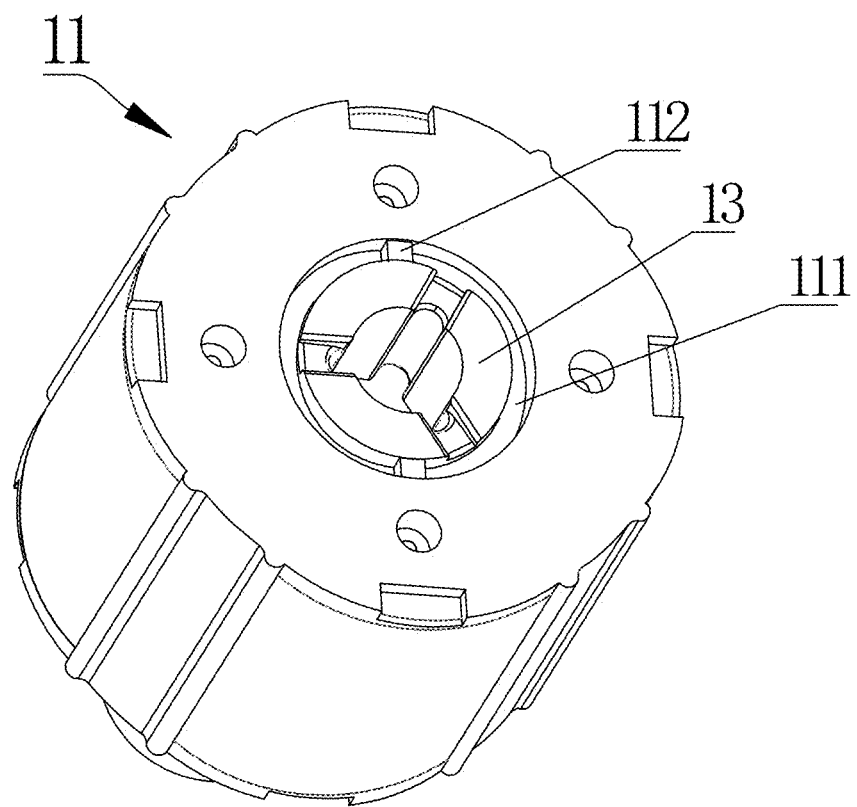
FIG. 13 is a schematic structural diagram showing a three-dimensional view of the first injection-molded part in FIG. 4 when viewed from another direction.

Referring to FIG. 13, the connecting part 16 includes a ring portion 161 and a positioning portion 162. The ring portion 161 surrounds an end of the first shaft sleeve 162. An end of the positioning portion 162 is attached to an inner peripheral surface of the ring portion 161, and another end of the positioning portion 162 is attached to an outer peripheral surface of the ring portion 161. The positioning portion 162 is protruded from a bottom surface of the ring portion 161. The rotor assembly, after being manufactured already, is arranged into a magnetizing fixture to be magnetized. A direction along which the rotor assembly is arranged may affect a direction along which the rotor assembly is magnetized. The positioning portion 162 is to provide a reference for arranging the rotor assembly, so as to prevent misarrangement of the rotor assembly, thereby facilitating magnetization of the rotor assembly.

Reference is made to FIG. 12 and FIG. 13. In this embodiment, a part of the outer peripheral surface of the first shaft sleeve 13 serves as the inner peripheral surface of the ring portion 161. Two positioning portions 162 are symmetrically distributed with respect to the central axis of the first shaft sleeve 13. A central symmetry plane of the positioning portions 162 coincides with a central symmetry plane of one of the permanent magnets 142. The "coincidence" here refers to theoretical coincidence, and there may be an error in the coincidence in practice. Any error in coincidence caused by manufacturing is within the protection scope of the present disclosure. In this embodiment, the center O1 of the outer peripheral surface of the permanent magnet 142 coincides with the central axis of the rotor core, and the center O2 of the inner peripheral surface of the permanent magnet 142 does not coincide with the central axis of the rotor core 142. Therefore, in order to form the first injection-molded part 11, the outer peripheral surface of the permanent magnet 142 serves as a positioning surface, proving a reference for placing the rotor 14 into the mold. Therefore, the central symmetry plane of the positioning portion 162 coincides with the central symmetry plane of the permanent magnet 142, thereby matching with the direction along which the rotor assembly is magnetized.

Figure 14:
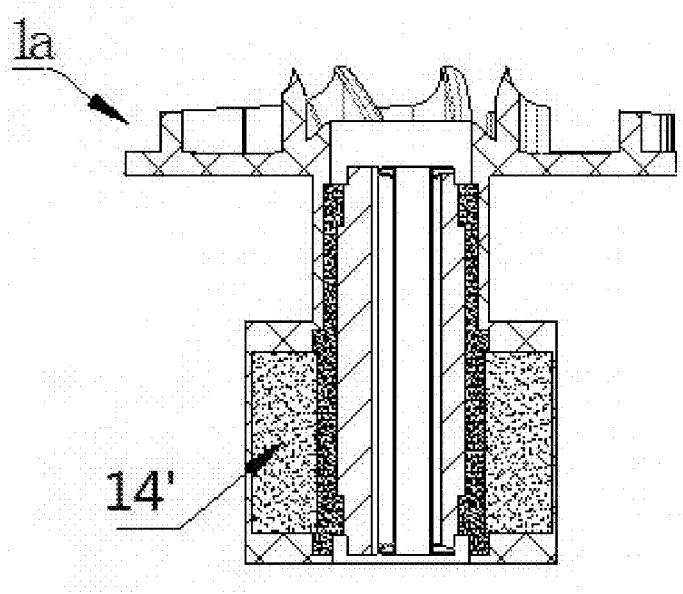
FIG. 14 is a schematic structural diagram showing a cross-section view of the rotor assembly in FIG. 1 according to a second embodiment.
Figure 15:
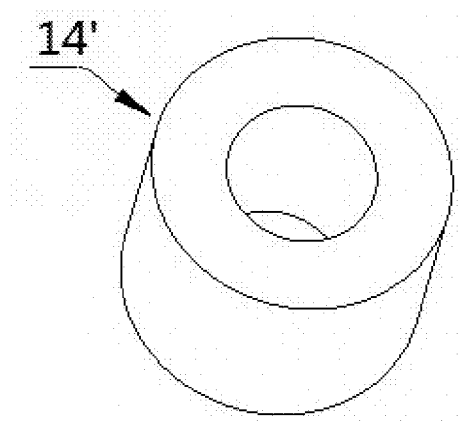
FIG. 15 is a schematic structural diagram showing a three-dimensional view of a rotor in FIG. 14.

Reference is made to FIG. 14 and FIG. 15, which are schematic structural diagrams showing the rotor assembly according to the second embodiment. The rotor assembly in the second embodiment is described in detail below.

Reference is made to FIG. 14 and FIG. 15. In this embodiment, the rotor 14' is annular, and includes an injection-molded part formed by injection molding with a combination of plastic material and magnetic material mixed in a certain proportion. The second injection-molded part 1a wraps the rotor 14', isolating the rotor 14' from the outside of the rotor assembly. Therefore, the rotor 14' is insulated from the working medium during an operation of the electric pump, thereby preventing the rotor 14' from being corroded by the working medium. Therefore, a service life of the rotor assembly is prolonged.

Compared with the rotor assembly disclosed in the first embodiment, the rotor 14' according to the second embodiment is annular, and includes the injection-molded part formed by injection molding with the combination of plastic material and magnetic material mixed in a certain proportion. The rotor 14' is of a simpler structure than that in the first embodiment.

A method for fabricating the rotor assembly described in the first embodiment and the second embodiment is described in detail below.

Reference is made to FIG. 2 to FIG. 16. The method for fabricating the rotor assembly 1 includes the following steps S1 to S3.

In step S1, a first shaft sleeve 13 and a rotor 14 are formed.

In step S2, a first injection-molded part 11 is formed by injection molding with the rotor 14 and the first shaft sleeve 13 serving as an inset for the injection molding.

In step S3, a second injection-molded part 12 is formed by injection molding with the first injection-molded part 11 serving as an insert for the injection molding. The second injection-molded part 12 includes a wrapping layer 122. The wrapping layer 122 partially wraps the first injection-molded part 11. The second injection-molded part 12 includes a lower cover plate 121 and a blade 15. The lower cover plate 121 and the blade 15 are integrally formed by injection molding.

With the above method, the first shaft sleeve is fixed by injection molding, thereby reducing requirements on strength of a material of the first shaft sleeve. Therefore, the manufacturing cost of the first shaft sleeve is reduced, and thus the manufacturing cost of the rotor assembly is reduced.

The formation of the first shaft sleeve includes the following steps S11 to S15.

In step S11, at least one limiting portion 131 is formed on the first shaft sleeve 13. The limiting portion 131 protrudes from an outer peripheral surface of a body portion 130 of the first shaft sleeve 13. Along an axis of the first shaft sleeve 13, the limiting portion 131 is shorter than the body portion 130 of the first shaft sleeve 13. In this embodiment, the limiting portion 131 is convex. Alternatively, the limiting portion 131 is concave from the outer peripheral surface of the first shaft sleeve 13, and extends along the circumference of the first shaft sleeve 13.

In step S12, a first hole portion 133 and at least one first concave portion 132 are formed on the first shaft sleeve 13. The first hole portion 133 extends along the axis of the first shaft sleeve 13, and extends through the first shaft sleeve 13. The first concave portion 132 extends along an axis the first hole portion 133, and is concave from an inner peripheral surface of the first hole 133 along a diameter of the first shaft sleeve 13.

In step S13, at least one second concave portion 134 is formed on the first shaft sleeve 13. The second concave portion 134 is in communication with the first concave portion 132. Along the axis of the first shaft sleeve 13, the second concave portion 134 is concave from an upper end surface of the first shaft sleeve 13, and is arranged close to an end of the first concave portion 132.

In step S14, at least one third concave portion 135 is formed on the first shaft sleeve 13. The third concave portion 135 is in communication with the first concave portion 134. Along the axis of the first shaft sleeve 13, the third concave portion 135 is concave from a lower end surface of the first shaft sleeve 13, and is arranged close to the other end of the first concave portion 132.

In step S15, a first stepped surface 1313 and a second stepped surface 1314 are formed on the first shaft sleeve 13. The first stepped surface 1313 is lower than the upper end surface 1311 of the first shaft sleeve 13, and the second stepped surface 1314 is higher than the lower end surface 1312 of the first shaft sleeve 13. The first stepped surface 1313 is above the second stepped surface 1314. An outer contour of the first stepped surface 1313 is farther from a central axis of the first shaft sleeve 13 than an outer contour of the upper end surface 1311 of the first shaft sleeve. An outer contour of the second stepped surface 1314 is farther from the central axis of the first shaft sleeve 13 than an outer contour of the lower end surface 1312 of the first shaft sleeve.

The formation of the rotor includes the following step S16.

Figure 16:
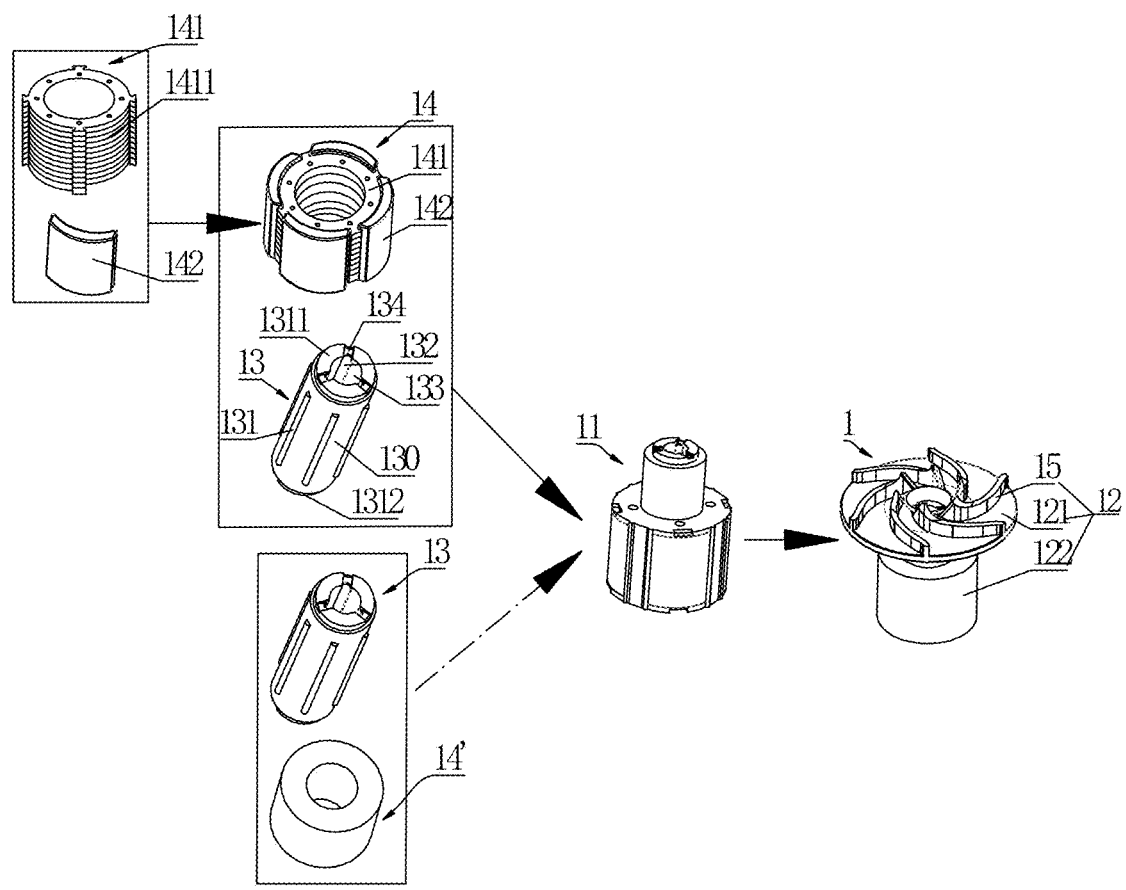
FIG. 16 is a schematic flow chart showing steps of a method for fabricating the rotor assembly according to the first embodiment and the second embodiment.

In step S16, the rotor 14 includes a rotor core 141 and a permanent magnet 142, and is formed by assembling the rotor core 141 and the permanent magnet 142. In an example, the rotor core 141 is formed by riveting laminated silicon steel sheets. As shown in FIG. 16, the rotor core 141 includes a mounting portion 1411. The mounting portion 1411 is concave. A process of assembling the rotor core 141 and the permanent magnet 142 includes: placing the permanent magnet 142 into the mounting portion 1411 with an inner peripheral surface of the permanent magnet 142 is fitted with a side surface of the mounting portion 1411. A position of the permanent magnet 142 is limited along the circumference of the rotor due to the mounting portion 1411.

Alternatively, the formation of the rotor 14 may include the following step S16'.

In step S16', the rotor 14' is formed by injection molding with a combination of magnetic material and plastic material mixed in a certain proportion.

It should be noted that the steps S11 to S16 are not necessarily performed sequentially, but may be performed simultaneously or in a different order than that is described. The method for forming the first shaft sleeve 13 in this embodiment includes the steps S11 to S15. Alternatively, the method for forming the first shaft sleeve 13 may include only one or several among the steps S11 to S15.

Figure 17:
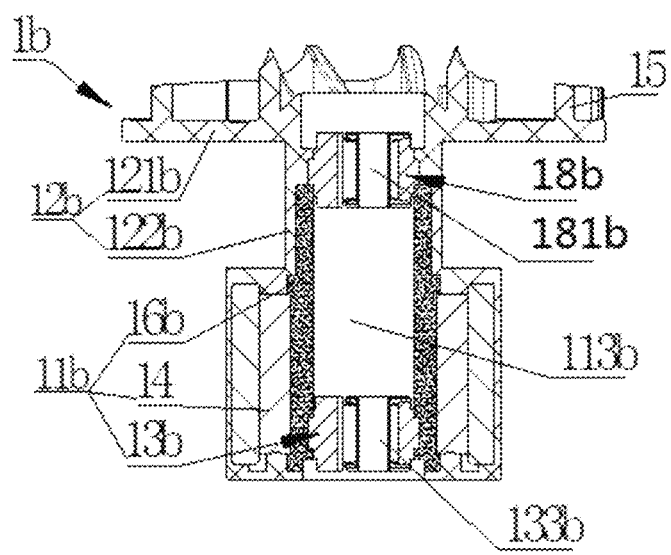
FIG. 17 is a schematic structural diagram showing a cross-section view of the rotor assembly in FIG. 1 according to a third embodiment.

Reference is made to FIG. 17, which is a schematic structural diagram showing the rotor assembly according to a third embodiment. The rotor assembly according to the third embodiment is described in detail below.

Reference is made to FIG. 17. In this embodiment, the rotor assembly 1b includes a first shaft sleeve 13b and a second shaft sleeve 18b. The second shaft sleeve 18b is arranged closer to a blade than the first shaft sleeve 13b. In this embodiment, a first injection-molded part 11b includes a rotor 14, the first shaft sleeve 13b and a connecting portion 16b. The connecting part 16b connects the first shaft sleeve 13b to the rotor 14. The connecting part 16b is made of plastic. The first injection-molded part 11b is formed by injection molding with the first shaft sleeve 13b and the rotor 14 serving as an insert for the injection molding. In this embodiment, a second injection-molded part 12b is formed by injection molding with the first injection-molded part 11b and the second shaft sleeve 18b serving as an insert for the injection molding. The second injection-molded part 12b includes a lower cover plate 121b and a wrapping layer 122b. The wrapping layer 122b partially wraps the first injection-molded part 11b. In this embodiment, the rotor assembly 1 further includes a blade 15. Along an axis of the rotor assembly 1, the lower cover plate 121b is closer to the rotor 14 than the blade 15. In this embodiment, the blade 15 and the lower cover plate 121b are integrally formed by injection molding. Alternatively, the blade 15 and the lower cover plate 121b may be formed separately, for which reference may be made to the rotor assembly described in the fourth and fifth embodiments, and thus details are not described here. With the above structure, the first shaft sleeve 13b and the second shaft sleeve 18b each are fixed by injection molding, which is conducive to reduction in requirements on strength of material of the first shaft sleeve 13 and a joint between the first shaft sleeve 13 and the rotor assembly in the rotor assembly 1 as well as material of the second shaft sleeve 18 and a joint between the second shaft sleeve 18 and the rotor assembly in the rotor assembly. Therefore, material costs of the first shaft sleeve 13b, the joint between the first shaft sleeve 13b and the rotor assembly in the rotor assembly 1, the second shaft sleeve 18b, and the joint between the second shaft sleeve 18b and the rotor assembly in the rotor assembly are reduced, thereby reducing the manufacturing cost of the rotor assembly.

Reference is made to FIG. 17. The first shaft sleeve 13b includes a first hole portion 133b extending along an axis of the first shaft sleeve 13b. The second shaft sleeve 18b includes a second hole portion 181b extending along an axis of the second shaft sleeve 18b. The first hole portion 133b and the second hole portion 181b are arranged on a common central axis. The "common central axis" here refers to a common axis theoretically, and there may be an error in practice. Any error in the common axis caused by manufacturing errors is within the protection scope of the present disclosure.

Reference is made to FIG. 17. In this embodiment, the connecting part 16b includes a third hole portion 113b extending along an axis of the connecting part 16b. The first shaft sleeve 13b is arranged near one end of the third hole portion 113b, and the second shaft sleeve 18b is arranged near the other end of the third hole portion 113b. A diameter of the first hole portion 133b is less than a diameter of the third hole portion 113b, and a diameter of the second hole portion 181b is less than the diameter of the third hole portion 113b. In this embodiment, in a process of forming the first injection-molded part 11b by injection molding with the first shaft sleeve 13b and the rotor 14 serving as an insert, an inner peripheral surface of the first shaft sleeve 13b may serve as a positioning surface, and a mold mandrel is fitted with the inner peripheral surface of the first shaft sleeve 13b. In a process of forming the second injection-molded part 12b by injection molding with the first injection-molded part 11b and the second shaft sleeve 18b serving as an insert, an inner peripheral surface of the second shaft sleeve 18b may serve as a positioning surface, and a mold mandrel is fitted with the inner peripheral surface of the second shaft sleeve 18b. Therefore, compared to the rotor assembly in the first embodiment, the mold mandrel is fitted with the shaft sleeve in smaller area, which is conducive to de-molding. Further, the shaft sleeve is made of less material, thereby reducing costs. As shown in FIG. 17, the first shaft sleeve 13b and the second shaft sleeve 18b are both greater than the third hole portion 113b in cross-section. In this embodiment, the first shaft sleeve 13b and the second shaft sleeve 18b each are equal to the limiting portion 131 in cross-section. In addition, structure of the rotor in the embodiment may refer to the structure of the rotor in the rotor assembly described in the first embodiment or the second embodiment, and thus is not described in detail here.

A method for fabricating the rotor assembly in the third embodiment is described in detail below.

Figure 18:
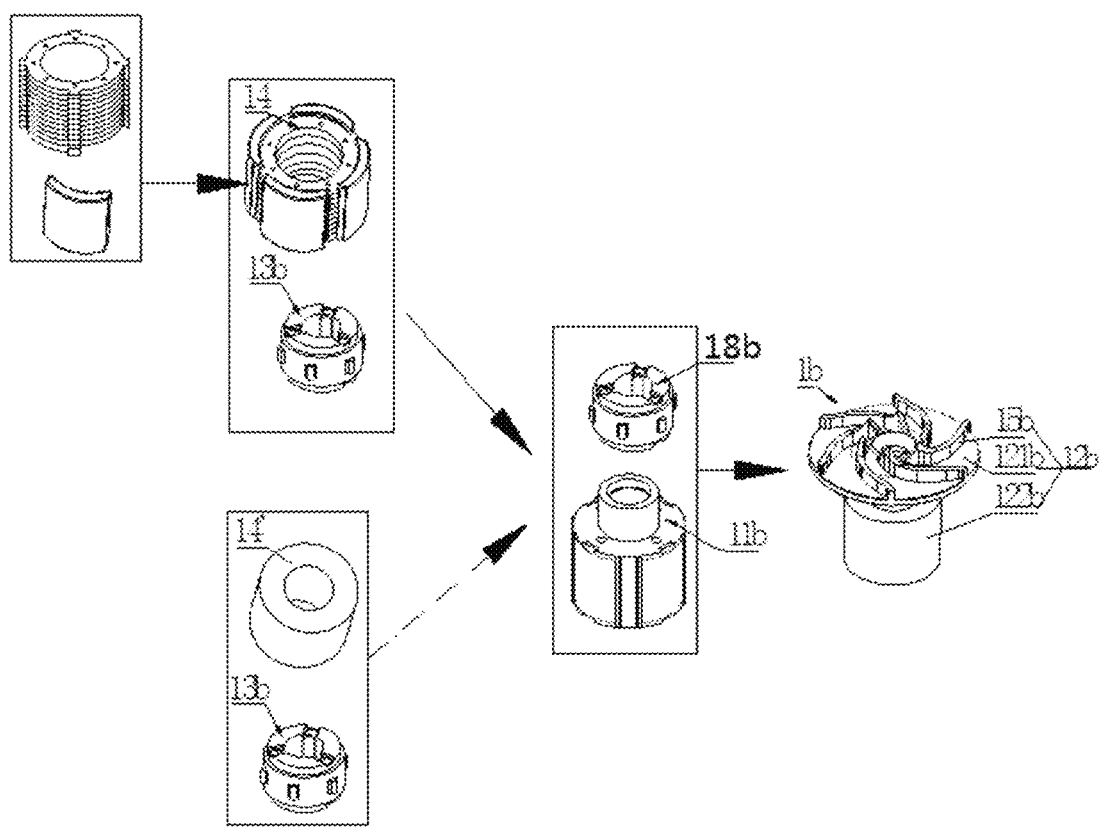
FIG. 18 is a schematic flow chart showing steps of a method for fabricating the rotor assembly according to the third embodiment.

Reference is made to FIG. 18. The method for fabricating the rotor assembly 1b includes the following steps S1 to S3.

In step S1, the first shaft sleeve 13b, the second shaft sleeve 18b, and the rotor 14 or 14' are formed. Here, formation of the first shaft sleeve 16b and the rotor 14 or 14' may refer to that described about the rotor assembly in the first embodiment or the second embodiment, and formation of the second shaft sleeve 18b may refer to the formation of the first shaft sleeve 13b, and thus are not described in detail here.

In step S2, the first injection-molded part 11b is formed by injection molding with the rotor 14 or 14' and the first shaft sleeve 13b serving as an inset for the injection molding.

In step S3, the second injection-molded part 12b is formed by injection molding with the first injection-molded part 11b and the second shaft sleeve 18b serving as an insert for the injection molding. The second injection-molded part 12b includes a wrapping layer 122b at least partially wrapping the first injection-molded part 11b. The second injection-molded part 12b includes a lower cover plate 121b and a blade 15b. The lower cover plate 121b and the blade 15b are formed integrally by injection molding. In this embodiment, in a process of forming the second injection-molded part, a plane defined by a first hole portion 133b of the first shaft sleeve 13b and a first hole portion 181b of the second shaft sleeve 18b serves as a positioning reference plane for a mold. The mold is inserted into the first hole portion of the first shaft sleeve 13b and the first hole portion 181b of the second shaft sleeve 18b, and is fitted with a side wall of the first hole portion 133b of the first shaft sleeve 13b and a side wall of the first hole portion 181b of the second shaft sleeve 18b. With the plane defined by the first hole portion 131b of the first shaft sleeve 13b and the first hole portion 181b of the second shaft sleeve 17b as the positioning reference plane for the mold, the first shaft sleeve 13b is accurately coaxial with the second shaft sleeve 18b.

With the method, the first shaft sleeve 13b and the second shaft sleeve 18b each are fixed by injection molding, thereby reducing requirements on strength of material of the first shaft sleeve 13b, and a joint between the first shaft sleeve 13b and the rotor assembly in the rotor assembly, as well as material of the second shaft sleeve 18b and a joint between the second shaft sleeve 18b and the rotor assembly in the rotor assembly. Therefore, material costs of the first shaft sleeve 13b, the joint between the first shaft sleeve 13b and the rotor assembly in the rotor assembly, the second shaft sleeve 18b, and the joint between the second shaft sleeve 18b and the rotor assembly in the rotor assembly are reduced, thereby reducing the manufacturing cost of the rotor assembly.

Figure 19:
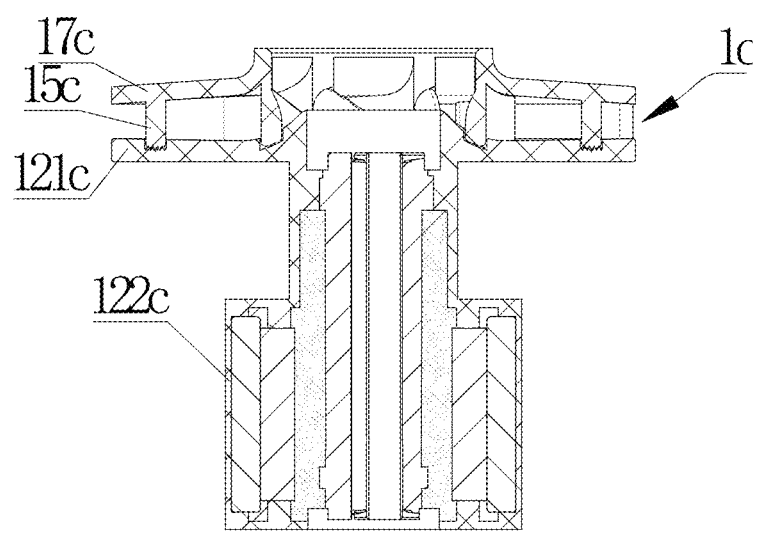
FIG. 19 is a schematic structural diagram showing a cross-section view of the rotor assembly in FIG. 1 according to a fourth embodiment.

Reference is made to FIG. 19, which is a schematic structural diagram showing a rotor assembly according to a fourth embodiment. The rotor assembly in the fourth embodiment is described in detail below.

Reference is made to FIG. 19. The rotor assembly 1c further includes an upper cover plate 17c and a blade 15c. The blade 15c is partially located between the upper cover plate 17c and a lower cover plate 121c, and the upper cover plate 17c is located above the lower cover plate 121c. In this embodiment, the upper cover plate 17c and the blade 15c are integrally formed by injection molding. Alternatively, the upper cover plate 17c and the blade 15c may be formed separately as described in the following two cases. In a first case, the upper cover plate 17c and the blade 15c are formed separately, and an upper end of the blade 15c is fixedly connected to the upper cover plate 17c, and a lower end of the blade 15c is fixedly connected to the lower cover plate 121c. In a second case, the upper cover plate 17c is formed independently, and the blade 15c and the lower cover plate 121c are integrally formed. Structure of the rotor 14 of the rotor assembly 1c in this embodiment is the same as the structure of the rotor of the rotor assembly in the first embodiment. Alternatively, the structure of the rotor 14 of the rotor assembly 1c in this embodiment may also refer to the structure of the rotor of the rotor assembly in the second embodiment. Other structural features of the rotor assembly in this embodiment may refer to the rotor assembly in the first embodiment, and thus not repeated here.

A method for fabricating the rotor assembly in the fourth embodiment is described in detail below.

Figure 20:
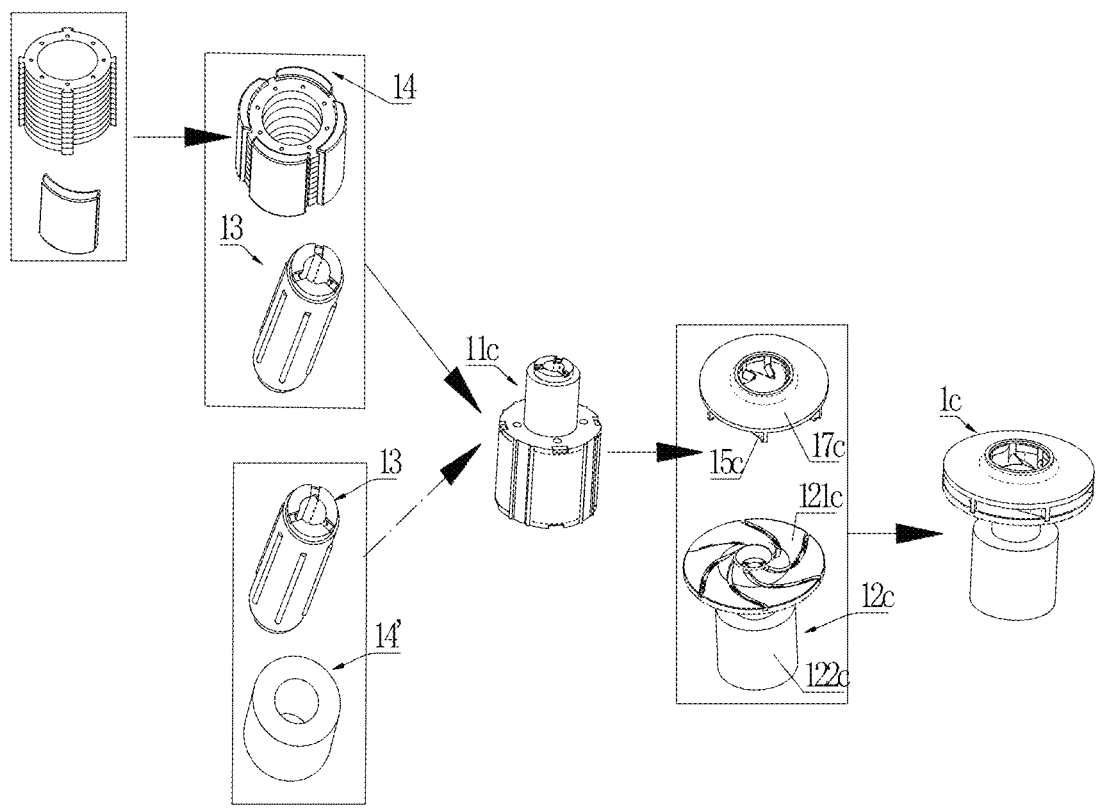
FIG. 20 is a schematic flow chart showing steps of a method for fabricating the rotor assembly according to the fourth embodiment.

Referring to FIG. 19 and FIG. 20, the method for fabricating the rotor assembly 1c includes the following steps S1 to S4.

In step S1, a first shaft sleeve 13, a rotor 14 or 14', an upper cover plate 17c, and a blade 15c are formed, where the upper cover plate 17c and the blade 15c are integrally formed by injection molding. Formation of the first shaft sleeve 13 and the rotor 14 or 14' may refer to the first embodiment or the second embodiment, and thus is not repeated here.

In step S2, a first injection-molded part 11c is formed by injection molding with the rotors 14 or 14' and the first shaft sleeve 13 serving as an insert for the injection molding.

In step S4, a second injection-molded part 12c is formed by injection molding with the first injection-molded part 11c serving as an insert for the injection molding. The second injection-molded part 12c includes a wrapping layer 122c and a lower cover plate 121c. The wrapping layer 122c at least partially wraps the first injection-molded part 11c. The rotor assembly 1c further includes the blade 15c and the upper cover plate 17c, which are formed integrally. The lower end of the blade 15c is fixedly connected to the lower cover plate 121c by welding.

Alternatively, the upper cover plate 17c and the blade 15c are formed separately. Step S4 is performed depending on the manner in which the upper cover plate 17c and the blade 15c are formed.

In a case that the blade 15c and the lower cover plate 121c are integrally formed, step S4 is the same as step S5 below. In step S5, the second injection-molded part is formed by injection molding with the first injection-molded part 11c serving as an insert for the injection molding. Structure of the second injection-molded part may refer to the structure of the rotor assembly in the first or second embodiment. The second injection-molded part includes the wrapping layer, and the wrapping layer at least partially wraps the first injection-molded part 11c. The second injection-molded part further includes the lower cover plate 121c and the blade 15c. The upper end of the blade 15c is fixedly connected to the upper cover plate 17c by welding, where the upper cover plate 17c is formed in step S1.

In a case that the upper cover plate 17c and the blade 15c are separately formed, the step S4 is the same as step S6 below. In step S6, the second injection-molded part is formed by injection molding with the first injection-molded part 11c serving as an insert for the injection molding. The second injection-molded part includes a wrapping layer, and the wrapping layer at least partially wraps the first injection-molded part 11c. The second injection-molded part includes a lower cover plate 121c. The upper end of the blade 15c is fixedly connected to the upper cover plate 17c by welding, and the lower end of the blade 15c is fixedly connected to the lower cover plate 121c by welding. The blade 15c and the upper cover plate 17c are formed in step S1.

With the method, the first shaft sleeve 13 is fixed by injection molding, thereby reducing requirements on the strength of material of the first shaft sleeve 13 and a joint for the first shaft sleeve 13 in the rotor assembly 1. Therefore, material costs for the first shaft sleeve 13 and the joint for the first shaft sleeve 13 in the rotor assembly are reduced, thereby reducing the manufacturing cost of the rotor assembly.

Figure 21:
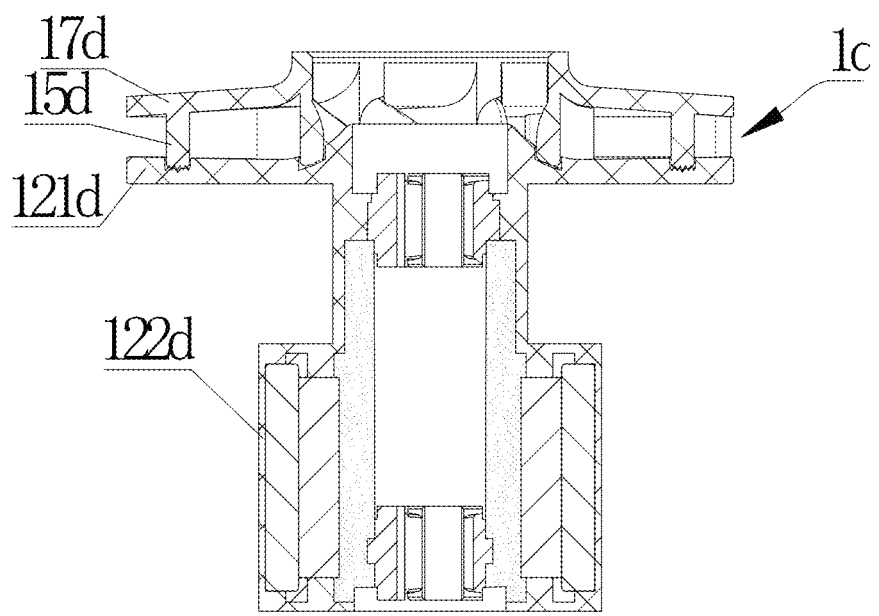
FIG. 21 is a schematic structural diagram showing a cross-section view of the rotor assembly in FIG. 1 according to a fifth embodiment.

Reference is made to FIG. 21, which is a schematic structural diagram showing a rotor assembly according to a fifth embodiment. Structure of the rotor assembly in the fifth embodiment is described in detail below.

Reference is made to FIG. 21. The rotor assembly 1d further includes an upper cover plate 17d and a blade 15d. The blade 15d is located between the upper cover plate 17d and a lower cover plate 121d, and the upper cover plate 17d is located above the lower cover plate 121d. In this embodiment, the upper cover plate 17d and the blade 15d are integrally formed by injection molding. Alternatively, the upper cover plate 17d and the blade 15d may be formed separately as described in the following two cases. In a first case, the upper cover plate 17d and the blade 15d are formed separately, an upper end of the blade 15d is fixedly connected to the upper cover plate 17d, and a lower end of the blade 15d is fixedly connected to the lower cover plate 121d. In a second case, the upper cover plate 17d is formed independently, and the blade 15d and the lower cover 121d are integrally formed. Structure of the rotor in the rotor assembly in this embodiment is the same as the structure of the rotor of the rotor assembly in the first embodiment. Alternatively, the structure of the rotor of the rotor assembly in this embodiment may also refer to the structure of the rotor of the rotor assembly in the second embodiment. A main difference between the rotor assembly in this embodiment and that in the fourth embodiment is that the rotor assembly 1d includes a first shaft sleeve 13d and a second shaft sleeve 18d, whose structures may refer to the third embodiment, and thus are not described in detail here.

A method for fabricating the rotor assembly in the fifth embodiment is described in detail below.

Figure 22:
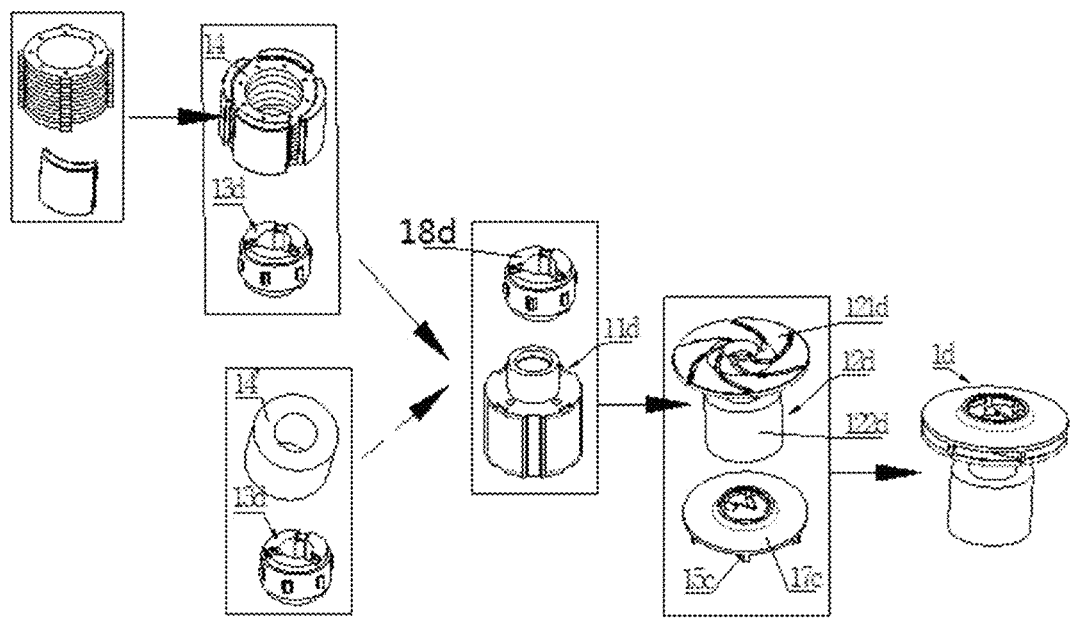
FIG. 22 is a schematic flow chart showing steps of a method for fabricating the rotor assembly according to the fifth embodiment.

Referring to FIG. 21 and FIG. 22, the method for fabricating the rotor assembly 1d includes the following steps S1 to S4.

In step S1, a first shaft sleeve 13d, a second shaft sleeve 18d, and a rotor (14, 14') are formed. Here, formation of the first shaft sleeve 13d and the rotor 14 or 14' may refer to the first embodiment and the second embodiment, and formation of the second shaft sleeve 18d may refer to the formation of the first shaft sleeve, and thus details are not repeated here.

In step S2, a first injection-molded part 11d is formed by injection molding with the rotor (14, 14') and the first shaft sleeve 13d serving as an inset for the injection molding.

In step S4, a second injection-molded part 12d is formed by injection molding with the first injection-molded part 11d and the second shaft sleeve 18d serving as an insert for the injection molding. The second injection-molded part 12d includes a wrapping layer 122d. The wrapping layer 122d at least partially wraps the first injection-molded part 11d. The rotor assembly 1d further includes a blade 15d and an upper cover plate 17d. The blade 15d and the upper cover plate 17d are integrally formed. A lower end of the blade 15d is fixedly connected to the lower cover plate 121d by welding.

Alternatively, the upper cover plate 17d and the blade 15d are formed separately. Step S4 is performed depending on the manner in which the upper cover plate 17c and the blade 15c are formed.

In a case that the blade 15d and the lower cover plate 121d are integrally formed, the step S4 is the same as step S5 below. In step S5, the second injection-molded part is formed by injection molding with the first injection-molded part 11d serving as an insert for the injection molding. In this case, the structure of the second injection-molded part may refer to the structure of the rotor assembly in the first or second embodiment. The second injection-molded part includes the wrapping layer, and the wrapping layer at least partially wraps the first injection-molded part 11d. The second injection-molded part includes the lower cover plate 121d and the blade 15d. The upper end of the blade 15d is fixedly connected to the upper cover plate 17d. The upper cover plate 17d is formed in step S1.

In a case that the upper cover plate 17d and the blade 15d are separately formed, the step S4 is the same as step S6 below. In step S6, the second injection-molded part is formed by injection molding with the first injection-molded part 11d serving as an insert for the injection molding. The second injection-molded part includes a wrapping layer, and the wrapping layer at least partially wraps the first injection-molded part 11d. The second injection-molded part includes a lower cover plate 121d. The upper end of the blade 15d is fixedly connected to the upper cover plate 17d by welding, and the lower end of the blade 15d is fixedly connected to the lower cover plate 121d by welding. The blade 15d and the upper cover plate 17d are formed in step S1.

With the method, the first shaft sleeve 13b and the second shaft sleeve 18b each are fixed by injection molding, thereby reducing requirements on strength of material of the first shaft sleeve 13b, and a joint between the first shaft sleeve 13b and the rotor assembly in the rotor assembly, as well as material of the second shaft sleeve 18b and a joint between the second shaft sleeve 18b and the rotor assembly in the rotor assembly. Therefore, material costs of the first shaft sleeve 13b, the joint between the first shaft sleeve 13b and the rotor assembly in the rotor assembly, the second shaft sleeve 18b, and the joint between the second shaft sleeve 18b and the rotor assembly in the rotor assembly are reduced, thereby reducing the manufacturing cost of the rotor assembly.

It should be noted that the above embodiments are provided to illustrate the present disclosure only, rather than limit the technical solutions described in the present disclosure. Although this specification has described the present disclosure in detail with reference to the above-mentioned embodiments, those of ordinary skill in the art should understand that modifications or equivalent replacements may be made on the present disclosure, and all technical solutions and improvements thereof that do not depart from the spirit and scope of the present disclosure shall fall within the scope of the claims in the present disclosure.

The invention claimed is:

1. A method for fabricating a rotor assembly, wherein the rotor assembly comprises a rotor and a first shaft sleeve, and the method for fabricating a rotor assembly comprises:
   S1, manufacturing the first shaft sleeve and the rotor;
   S2, forming a first injection-molded part by injection molding, wherein the rotor and the first shaft sleeve serve as an insert for the injection molding; and
   the method for fabricating a rotor assembly further comprises one of S3 to S6:
   S3, forming a second injection-molded part by injection molding, wherein at least the first injection-molded part serves as an insert for the injection molding, and wherein
      the second injection-molded part comprises a wrapping layer at least partially wrapping the first injection-molded part; and
      the second injection-molded part further comprises a lower cover plate and a blade that are integrally formed by injection molding;
   S4, forming a second injection-molded part by injection molding, wherein at least the first injection-molded part serves as an insert for the injection molding, and wherein
      the second injection-molded part comprises a wrapping layer at least partially wrapping the first injection-molded part,
      the second injection-molded part further comprises a lower cover plate,
      the rotor assembly further comprises a blade and an upper cover plate that are integrally formed,
      a lower end of the blade is fixedly connected to the lower cover plate by welding, and
      the blade and the upper cover plate are formed in S1;
   S5, forming a second injection-molded part by injection molding, wherein at least the first injection-molded part serves as an insert for the injection molding, and wherein the second injection-molded part comprises a wrapping layer at least partially wrapping the first injection-molded part, the second injection-molded part further comprises a lower cover plate and a blade, the rotor assembly further comprises an upper cover plate, an upper end of the blade is fixedly connected to the upper cover plate by welding; and the upper cover plate is formed in S1; and S6, forming a second injection-molded part by injection molding, wherein at least the first injection-molded part serves as an insert for the injection molding, and wherein the second injection-molded part comprises a wrapping layer at least partially wrapping the first injection-molded part, the second injection-molded part further comprises a lower cover plate, the rotor assembly further comprises a blade and an upper cover plate, an upper end of the blade is fixedly connected to the upper cover plate by welding, a lower end of the blade is fixedly connected to the lower cover by welding, and the blade and the upper cover plate are formed in S1.

2. The method according to claim 1, wherein
the rotor assembly further comprises a second shaft sleeve, S1 further comprises:

manufacturing the second shaft sleeve, wherein the second injection-molded part is formed by injection molding with the second shaft sleeve and the first injection-molded part as the insert for the injection molding in S3 to S6.

3. The method according to claim 2, wherein
the manufacturing the first shaft sleeve comprises: forming a hole portion of the first shaft sleeve, wherein the hole of the first shaft sleeve extends along an axis of the first shaft sleeve;

the manufacturing the second shaft sleeve comprises: forming a hole portion of the second shaft sleeve, wherein the hole portion of the second shaft sleeve extends along an axis of the second shaft sleeve; and the forming a second injection-molded part by injection molding comprises:

determining a plane defined by the hole portion of the first shaft sleeve and the hole portion of the second shaft sleeve, as a positioning reference plane for a mold, inserting the mold into the hole portion of the first shaft sleeve and the hole portion of the second shaft sleeve, and fitting the mold with a side wall of the hole portion of the first shaft sleeve and a side wall of the hole portion of the second shaft sleeve.

4. The method according to claim 3, wherein
the manufacturing the first shaft sleeve in S1 comprises: forming at least one limiting portion on the first shaft sleeve, wherein the limiting portion is protruded from an outer peripheral surface of the first shaft sleeve and extends along an axis of the first shaft sleeve, and the limiting portion is shorter than the first shaft sleeve; and the forming the first injection-molded part by injection molding comprises: wrapping injected plastic around the limiting portion, to limit the first shaft sleeve circumferentially and axially.

5. The method according to claim 3, wherein
the manufacturing the first shaft sleeve in S1 comprises: forming at least one limiting portion on the first shaft sleeve, wherein the limiting portion is concave along a circumference of the first shaft sleeve; and the forming a first injection-molded part by injection molding comprises: filling the limiting portion with injected plastic, to limit the first shaft sleeve axially.

6. The method according to claim 2, wherein
the manufacturing the first shaft sleeve in S1 comprises: forming at least one limiting portion on the first shaft sleeve, wherein the limiting portion is protruded from an outer peripheral surface of the first shaft sleeve and extends along an axis of the first shaft sleeve, and the limiting portion is shorter than the first shaft sleeve; and the forming the first injection-molded part by injection molding comprises: wrapping injected plastic around the limiting portion, to limit the first shaft sleeve circumferentially and axially.

7. The method according to claim 2, wherein
the manufacturing the first shaft sleeve in S1 comprises: forming at least one limiting portion on the first shaft sleeve, wherein the limiting portion is concave along a circumference of the first shaft sleeve; and the forming a first injection-molded part by injection molding comprises: filling the limiting portion with injected plastic, to limit the first shaft sleeve axially.

8. The method according to claim 1, wherein
the manufacturing the first shaft sleeve in S1 comprises: forming at least one limiting portion on the first shaft sleeve, wherein the limiting portion is protruded from an outer peripheral surface of the first shaft sleeve and extends along an axis of the first shaft sleeve, and the limiting portion is shorter than the first shaft sleeve; and the forming the first injection-molded part by injection molding comprises: wrapping injected plastic around the limiting portion, to limit the first shaft sleeve circumferentially and axially.

9. The method according to claim 8, wherein
the manufacturing the first shaft sleeve in step S1 further comprises: forming a first stepped surface and a second stepped surface on the first shaft sleeve, wherein the first stepped surface is arranged below an upper end of the first shaft sleeve, the second stepped surface is arranged above a lower end of the first shaft sleeve, and the first stepped surface is arranged above the second stepped surface, an outer contour of the first stepped surface is farther from a central axis of the first shaft sleeve than an outer contour of the upper end surface of the first shaft sleeve, and an outer contour of the second stepped surface is farther from the central axis of the first shaft sleeve than an outer contour of the lower end surface of the first shaft sleeve; and the forming the first injection-molded part by injection molding comprises: determining a plane defined by the first stepped surface and the second stepped surface as a positioning reference plane for a mold, and inserting the upper end surface of the first shaft sleeve and the lower end surface of the first shaft sleeve into a cavity of the mold to insulate the upper end surface and the lower end surface of the first shaft sleeve from the injected plastic.

10. The method according to claim 1, wherein
the manufacturing the first shaft sleeve in S1 comprises:
forming at least one limiting portion on the first shaft sleeve, wherein the limiting portion is concave along a circumference of the first shaft sleeve; and
the forming a first injection-molded part by injection molding comprises: filling the limiting portion with injected plastic, to limit the first shaft sleeve axially.

11. The method according to claim 10, wherein
the manufacturing the first shaft sleeve in step S1 further comprises: forming a first stepped surface and a second stepped surface on the first shaft sleeve, wherein
the first stepped surface is arranged below an upper end of the first shaft sleeve,
the second stepped surface is arranged above a lower end of the first shaft sleeve, and the first stepped surface is arranged above the second stepped surface,
an outer contour of the first stepped surface is farther from a central axis of the first shaft sleeve than an outer contour of the upper end surface of the first shaft sleeve, and
an outer contour of the second stepped surface is farther from the central axis of the first shaft sleeve than an outer contour of the lower end surface of the first shaft sleeve; and
the forming the first injection-molded part by injection molding comprises: determining a plane defined by the first stepped surface and the second stepped surface as a positioning reference plane for a mold, and inserting the upper end surface of the first shaft sleeve and the lower end surface of the first shaft sleeve into a cavity of the mold to insulate the upper end surface and the lower end surface of the first shaft sleeve from the injected plastic.

12. The method according to claim 1, wherein
the manufacturing the rotor in S1 comprises: forming the rotor by injection molding with a combination of magnetic material and plastic material mixed in a certain proportion.

13. The method according to claim 1, wherein,
the rotor comprises a rotor core and a permanent magnet, and the manufacturing the rotor comprises in S1: assembling the rotor core to the permanent magnet.

14. The method according to claim 13, wherein
the rotor core is manufactured by: riveting laminated silicon steel sheets, wherein the rotor core comprises a mounting portion that is concave;
wherein the assembling the rotor core to the permanent magnet comprises: arranging the permanent magnet in the mounting portion with an inner peripheral surface of the permanent magnet being fitted with a side wall of the mounting portion, wherein the permanent magnet is limited by the mounting portion along a circumference of the rotor.

15. The method according to claim 14, wherein
the inner peripheral surface of the permanent magnet is concave and the outer peripheral surface of the permanent magnet is convex;
a center of the outer peripheral surface of the permanent magnet does not coincide with a central axis of the rotor core in cross section, and
a center of the inner peripheral surface of the permanent magnet coincides with the central axis of the rotor core in cross section;
wherein the forming the first injection-molded part by injection molding comprises: determining a plane defined by the outer peripheral surface of the permanent magnet as a positioning reference plane for the mold, to provide a reference for placing the rotor into the mold.

\* \* \* \* \*